(12) United States Patent
Kano et al.

(10) Patent No.: US 10,354,809 B2
(45) Date of Patent: Jul. 16, 2019

(54) ELECTROCHEMICAL DEVICE AND METHOD OF MANUFACTURING ELECTROCHEMICAL DEVICE

(71) Applicant: TAIYO YUDEN CO., LTD., Taito-ku, Tokyo (JP)

(72) Inventors: Koji Kano, Takasaki (JP); Shinji Ishii, Takasaki (JP); Katsunori Yokoshima, Takasaki (JP); Hiroki Takahashi, Takasaki (JP); Takatoshi Nagase, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 15/433,811

(22) Filed: Feb. 15, 2017

(65) Prior Publication Data

US 2017/0236656 A1 Aug. 17, 2017

(30) Foreign Application Priority Data

Feb. 15, 2016 (JP) ................................ 2016-025621

(51) Int. Cl.
*H01G 11/06* (2013.01)
*H01G 11/52* (2013.01)
(Continued)

(52) U.S. Cl.
CPC .............. *H01G 11/06* (2013.01); *H01G 11/28* (2013.01); *H01G 11/70* (2013.01); *H01G 11/82* (2013.01); *H01G 11/86* (2013.01); *Y02E 60/13* (2013.01)

(58) Field of Classification Search
CPC ...... H01G 9/155; H01G 9/048; H01G 9/0029; H01G 11/52; H01G 11/70; H01G 11/86; Y02E 60/13
(Continued)

(56) References Cited

U.S. PATENT DOCUMENTS

2011/0256438 A1 10/2011 Taguchi et al.

FOREIGN PATENT DOCUMENTS

CN 102301439 A 12/2011
JP H10233234 A 9/1998
(Continued)

OTHER PUBLICATIONS

A Notification of Reason for Refusal issued by Korean Intellectual Property Office, dated Dec. 20, 2017, for Korean counterpart application No. 1020170010366.
(Continued)

*Primary Examiner* — Eric W Thomas
*Assistant Examiner* — Arun Ramaswamy
(74) *Attorney, Agent, or Firm* — Law Office of Katsuhiro Arai

(57) ABSTRACT

An electrochemical device is constituted by a positive electrode, a negative electrode, and separators that are wound in such a way that the first principal face of the negative electrode and third principal face of the positive electrode are on the inner side of winding, while the second principal face of the negative electrode and fourth principal face of the positive electrode are on the outer side of winding, with the separators separating the positive electrode and negative electrode; wherein the second principal face has a first region opposed to the positive electrode via the separator and a second region on the outermost side of winding and not opposed to the positive electrode, the second region includes a first uncoated region where no negative electrode active material layer is formed, and a metal lithium is joined to the first uncoated region and immersed in electrolytic solution.

9 Claims, 14 Drawing Sheets

(51) Int. Cl.
    *H01G 11/70* (2013.01)
    *H01G 11/86* (2013.01)
    *H01G 9/00* (2006.01)
    *H01G 9/048* (2006.01)
    *H01G 11/28* (2013.01)
    *H01G 11/82* (2013.01)

(58) Field of Classification Search
    USPC ................. 361/502, 520, 503, 510, 511, 512
    See application file for complete search history.

(56) References Cited

FOREIGN PATENT DOCUMENTS

| | | | |
|---|---|---|---|
| JP | H11283676 A | | 10/1999 |
| JP | 2007067105 A | * | 3/2007 |
| JP | 4161400 B2 | | 10/2008 |
| JP | 2009059732 A | | 3/2009 |
| JP | 2009187751 A | | 8/2009 |
| JP | 2010157541 A | | 7/2010 |
| JP | 2010232565 A | | 10/2010 |
| JP | 2011119145 A | | 6/2011 |
| JP | 2011139006 A | | 7/2011 |
| JP | 2014207359 A | | 10/2014 |

OTHER PUBLICATIONS

A Notification of Reasons for Refusal issued by the Japanese Patent Office, dated Apr. 3, 2018, for Japanese counterpart application No. 2016-025621.
A First Office Action issued by the State Intellectual Property Office of China dated May 24, 2018 for Chinese counterpart application No. 201710080927.4.

* cited by examiner

FIG. 14

|  | Metal lithium remaining [Number of devices] | After charge/discharge cycles [Number of devices] | Usage of metal lithium | Capacitance obtained |
|---|---|---|---|---|
| Example 1 | 0/20 | 0/20 | 100% | 32.6F |
| Comparative Example 1 | 18/20 | 0/20 | 100% | 28.5F |
| Comparative Example 2 | 0/20 | 0/20 | 120% | 32.3F |
| Comparative Example 3 | 0/20 | 1/20 | 100% | 32.4F |

ELECTROCHEMICAL DEVICE AND METHOD OF MANUFACTURING ELECTROCHEMICAL DEVICE

BACKGROUND

Field of the Invention

The present invention relates to an electrochemical device having an electric storage element constituted by a positive electrode, a negative electrode and separators that are wound together, as well as a method of manufacturing such electrochemical device.

Description of the Related Art

Capacitors and other electrochemical devices are drawing attention in recent years for use in systems for storing clean energy such as solar or wind generation power, as well as for primary or auxiliary power supplies for automobiles, hybrid electric vehicles, etc. Here, electric double-layer capacitors produce high output but offer low capacitance, while batteries offer high capacitance but produce low output. Accordingly, lithium ion capacitors whose negative electrode uses a material capable of occluding lithium, are seeing growing applications as replacements for batteries because they offer greater capacitance than electric double-layer capacitors and last longer than batteries.

On the other hand, lithium ion capacitors require a process called "pre-doping" where lithium ions are doped into the negative electrode. For example, Patent Literature 1 discloses a lithium ion capacitor with a metal lithium sheet being wound and placed in electrodes for occluding and doping lithium ions.

Also, Patent Literature 2 discloses a lithium ion electric storage element constituted by a negative electrode collector on which an active material layer is stacked, wherein a region where no active material layer is stacked is formed on the negative electrode collector and lithium is placed in this region for pre-doping.

Also, Patent Literature 3 discloses a lithium ion capacitor having at least two separators sandwiched between positive and negative electrodes adjoining lithium metal that supplies lithium ions, so that a specified amount of lithium ions can be doped into the negative electrode without causing short-circuit or other problems.

BACKGROUND ART LITERATURES

[Patent Literature 1] Japanese Patent Laid-open No. 2011-139006
[Patent Literature 2] Japanese Patent Laid-open No. 2010-232565
[Patent Literature 3] Japanese Patent Laid-open No. 2009-59732

SUMMARY

One way to place a lithium source in an electrochemical device requiring lithium ion pre-doping, is to attach lithium to a lithium collector and then connect the lithium collector to the negative electrode collector as described above. However, this method presents a problem of low productivity because the lithium collector must be prepared separately and also because a process is required through which to connect the lithium collector to the negative electrode collector.

Also, the inventions described in Patent Literatures 1 to 3 may not be reliable because fine lithium powder that generates when lithium ions are pre-doped into the negative electrode, may reach the positive electrode positioned on the opposite side from the negative electrode, to cause the voltage to drop.

In light of the aforementioned situation, an object of the present invention is to provide an electrochemical device offering excellent productivity and reliability, as well as a method of manufacturing such electrochemical device.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the electrochemical device pertaining to an embodiment of the present invention has a negative electrode, a positive electrode, separators, and electrolytic solution.

The negative electrode is constituted by a negative electrode collector which is a metal foil having a first principal face and a second principal face on the opposite side of the first principal face, and also by negative electrode active material layers formed on the first principal face and second principal face.

The positive electrode is constituted by a positive electrode collector which is a metal foil having a third principal face and a fourth principal face on the opposite side of the third principal face, and also by positive electrode active material layers formed on the third principal face and fourth principal face.

The separators insulate the positive electrode and negative electrode.

The electrolytic solution immerses the positive electrode, negative electrode, and separators.

The aforementioned electrochemical device is an electrochemical device constituted by the positive electrode, negative electrode, and separators that are stacked and wound in such a way that the first principal face and third principal face are on the inner side of winding, while the second principal face and fourth principal face are on the outer side of winding, with the separators separating the positive electrode and negative electrode; wherein: the first principal face is opposed to the positive electrode via the separator; the second principal face has a first region opposed to the positive electrode via the separator, and a second region on the outermost side of winding and not opposed to the positive electrode; and the second region includes a first uncoated region where the negative electrode active material layer is not formed, and the first uncoated region has metal lithium joined to it and is immersed in the electrolytic solution to pre-dope lithium ions into the negative-electrode active layer.

According to this constitution, metal lithium is joined to the second principal face on the outermost side of winding not opposed to the positive electrode via the separator. This means that, even if fine lithium powder generates when lithium ions are pre-doped into the negative electrode, the lithium powder is prevented from contacting the positive electrode. This makes it unlikely for problems to occur due to the effect of lithium powder generating in the process of pre-doping into the negative electrode, which in turn makes it possible to ensure reliability in a more stable manner than heretofore achievable with the conventional lithium ion capacitors.

Also, the aforementioned electrochemical device allows the second region on the second principal face of the negative electrode collector to be used as a surface for installing the metal lithium. This eliminates the need for a step to separately prepare a lithium collector or other component and connect this component to the negative electrode in order to pre-dope lithium ions into the negative electrode, and accordingly, productivity can be improved. Accordingly, the present invention can provide an electrochemical device offering excellent productivity and reliability.

The first uncoated region can be provided over the entire second region.

According to this constitution, metal lithium can be attached over the entire second region on the second principal face of the negative electrode collector. This way, a sufficient amount of lithium ions can be pre-doped into the negative electrode to increase the capacitance of the capacitor.

The negative electrode includes a first negative electrode active material layer formed in the first region, as well as a second negative electrode active material layer formed in the second region at the end of the negative electrode collector away from the first negative electrode active material layer, and the first uncoated region may be provided between the first negative electrode active material layer and the second negative electrode active material layer.

By providing the second negative electrode active material layer at the end of the negative electrode collector, separator damage caused by cut sides of the negative electrode collector can be prevented.

The second principal face may include a second uncoated region where the negative electrode active material layer is not provided at the end of the negative electrode collector on the innermost side of winding.

This removes a part of the negative electrode active material layer on the outermost side of winding not involved in charging or discharging of the capacitor, so the electric storage element can be made smaller.

The negative electrode collector may be made of copper.

Copper is strong, even when thin, and highly flexible, so it is suitable for the material of the negative electrode collector. By pressure-bonding copper with metal lithium, the electrolytic solution no longer enters the pressure-bonded interface, which prevents the metal lithium from dissolving from the interface side, while the conductivity between the negative electrode collector and metal lithium is maintained. As a result, lithium ions can be pre-doped into the negative electrode properly.

The negative electrode collector may have multiple through holes.

By forming through holes in the negative electrode collector, the efficiency of pre-doping lithium ions into the negative electrode can be improved.

To achieve the aforementioned object, the method of manufacturing electrochemical device pertaining to an embodiment of the present invention comprises: a step to produce a negative electrode by forming a negative electrode active material layer on the first principal face and second principal face of a negative electrode collector which is a metal foil having a first principal face and a second principal face on the opposite side of the first principal face, and then forming on the second principal face an uncoated region where the negative electrode active material layer is not provided; a step to join metal lithium to the uncoated region; a step to prepare a positive electrode that has a positive electrode collector which is a metal foil having a third principal face and a fourth principal face on the opposite side of the third principal face, and also has positive electrode active material layers formed on the third principal face and fourth principal face, and stack the positive electrode, separators, and the negative electrode to form a laminate; a step to form an electric storage element by winding the laminate in such a way that the first principal face and third principal face are on the inner side of winding, while the second principal face and fourth principal face are on the outer side of winding, so that the separators separate the positive electrode and negative electrode, wherein the first principal face is opposed to the positive electrode via the separator, the second principal face has a first region opposed to the positive electrode via the separator as well as a second region on the outermost side of winding and not opposed to the positive electrode, and the uncoated region is provided in the second region; and a step to immerse the electric storage element in the electrolytic solution to dope lithium ions into the negative electrode active material layer from the metal lithium.

In the step to produce a negative electrode, a negative electrode collector is prepared which is a metal foil having a first principal face and a second principal face on the opposite side of the first principal face, and a first negative electrode active material layer may be formed over the entire first principal face, with multiple second negative electrode active material layers formed on the second principal face at specified intervals, and the negative electrode collector and first negative electrode active material layer may be cut out together between the second negative electrode active material layers.

In the step to produce a negative electrode, a negative electrode collector is prepared which is a metal foil having a first principal face and a second principal face on the opposite side of the first principal face, and a first negative electrode active material layer may be formed over the entire first principal face, with multiple second negative electrode active material layers formed on the second principal face at specified intervals, and the second negative electrode active material layers, negative electrode collector, and first negative electrode active material layer may be cut out together.

As described above, an electrochemical device offering excellent productivity and reliability, as well as a method of manufacturing such electrochemical device, can be provided according to the present invention.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 14 is a table showing the results of characteristics tests performed on the electrochemical devices pertaining to an example and comparative examples of the present invention.

DESCRIPTION OF THE SYMBOLS

100—Electrochemical device
110—Electric storage element
120—Container
130—Negative electrode
130a—First uncoated region
130b—Second uncoated region
131—Negative electrode terminal
132—Negative electrode collector
132a—First principal face
132b—Second principal face
132c—First region
132d—Second region
133—Negative electrode active material layer
140—Positive electrode
141—Positive electrode terminal
142—Positive electrode collector
142a—Third principal face
142b—Fourth principal face
143—Positive electrode active material layer
151—First separator
152—Second separator
M—Metal lithium

DETAILED DESCRIPTION OF EMBODIMENTS

The electrochemical device proposed by the present invention is explained. The electrochemical device pertaining to this embodiment is an electrochemical device that uses lithium ions to transport electric charges, such as a lithium ion capacitor.

[Constitution of Electrochemical Device]

Figure 1:
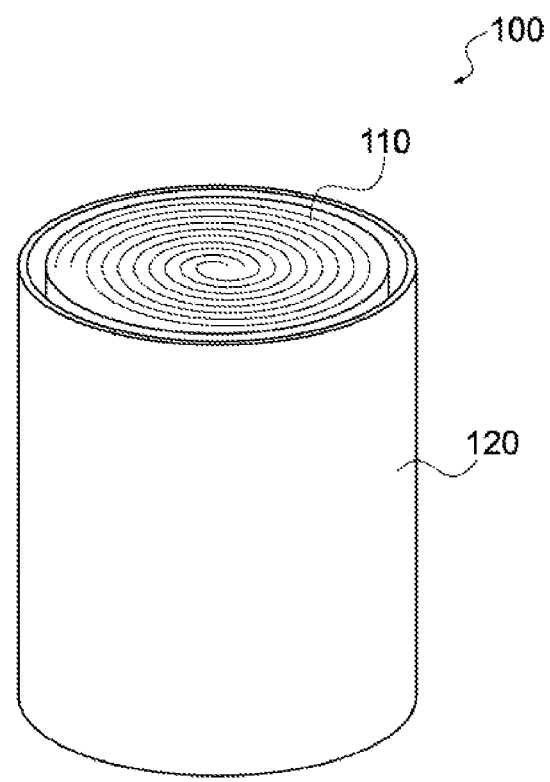
FIG. 1 is a perspective view showing the constitution of an electrochemical device pertaining to an embodiment.

FIG. 1 is a perspective view showing the constitution of the electrochemical device 100 pertaining to this embodiment. As shown in the figure, the electrochemical device 100 is constituted by an electric storage element 110 and a container 120 (its lid and terminals are not illustrated) housing it. Electrolytic solution is housed in the container 120, together with the electric storage element 110.

Figure 2:
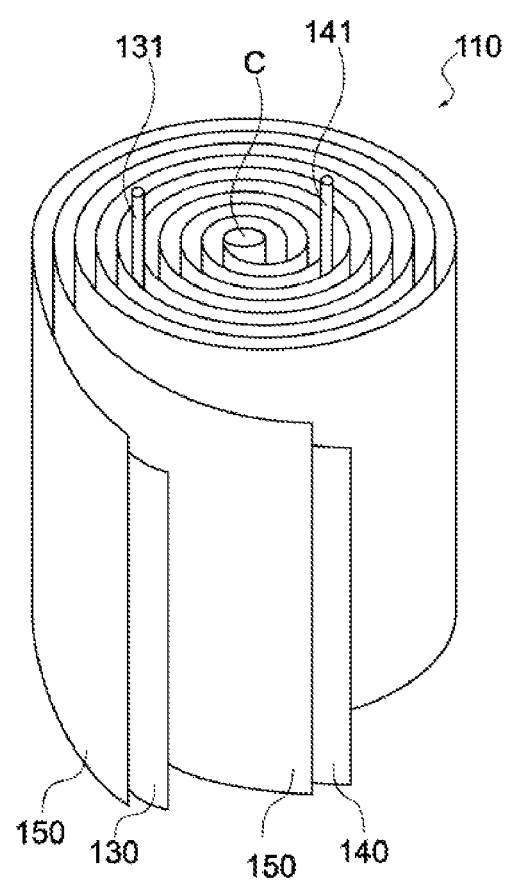
FIG. 2 is a perspective view of the electric storage element in the same embodiment.
Figure 3:
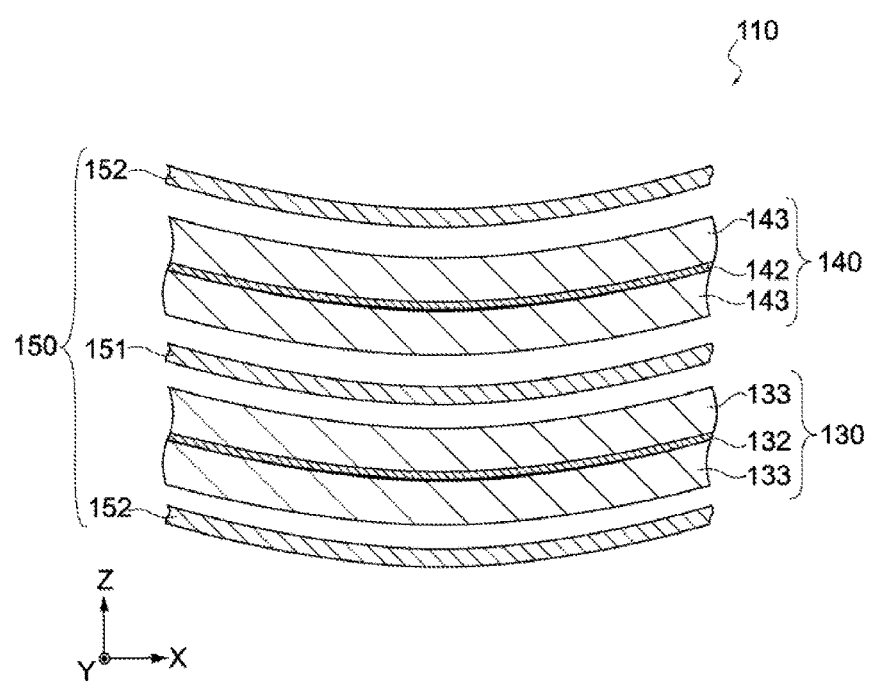
FIG. 3 is an enlarged section view of the electric storage element in the same embodiment.

FIG. 2 is a perspective view of the electric storage element 110, while FIG. 3 is an enlarged section view of the electric storage element 110. As shown in FIGS. 2 and 3, the electric storage element 110 has a negative electrode 130, a positive electrode 140, and separators 150, and is constituted in such a way that a laminate, consisting of the foregoing stack, is wound around a winding core C. It should be noted that, in the following figures, the X, Y and Z directions represent three directions that are orthogonal to each other. It should be noted, also, that the winding core C need not be provided.

The negative electrode 130, positive electrode 140 and separators 150 constituting the electric storage element 110 are stacked in the order of separator 150, negative electrode 130, separator 150, and positive electrode 140, toward the winding core C (from the outer side of winding), as shown in FIG. 2. Also, the electric storage element 110 has a negative electrode terminal 131 and a positive electrode terminal 141, as shown in FIG. 2. The negative electrode terminal 131 is connected to the negative electrode, while the positive electrode terminal 141 is connected to the positive electrode, and both are led out to the exterior of the electric storage element 110, as shown in FIG. 2.

The negative electrode 130 has a negative electrode collector 132 and negative electrode active material layers 133, as shown in FIG. 3. The negative electrode collector 132 is made of conductive material, and may be a copper foil or other metal foil. The negative electrode collector 132 is a metal foil whose surface is roughened by a chemical or mechanical means, or a metal foil in which through holes have been formed, but in this embodiment, a metal foil in which through holes have been formed is typically adopted.

The negative electrode active material layers 133 are formed on the negative electrode collector 132. The material for the negative electrode active material layers 133 may be a mixture of a negative electrode active material and a binder resin, which may further contain a conductive aid. For the negative electrode active material, any material capable of adsorbing lithium ions in the electrolytic solution may be used, such as non-graphitizable carbon (hard carbon), graphite, soft carbon, or other carbon material.

For the binder resin, any synthetic resin that joins the negative electrode active material may be used, such as styrene butadiene rubber, polyethylene, polypropylene, polyethylene terephthalate, aromatic polyamide, carboxy methyl cellulose, fluororubber, polyvinylidene fluoride, isoprene rubber, butadiene rubber, and ethylene propylene rubber, for example.

The conductive aid is constituted by grains made of conductive material, and improves the conductivity between negative electrode active materials. The conductive aid may be graphite, carbon black, or other carbon material, for example. Any of these may be used alone or multiple types may be mixed. It should be noted that the conductive aid may be a material having conductivity, such as metal material and conductive polymer, among others.

Figure 4A:
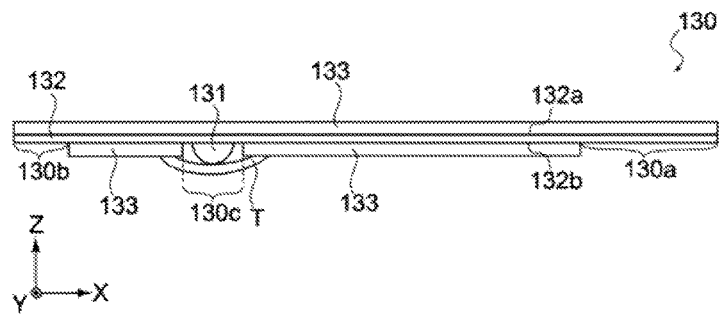
FIGS. 4A and 4B provide schematic views showing the negative electrode before winding in the same embodiment.
Figure 4B:
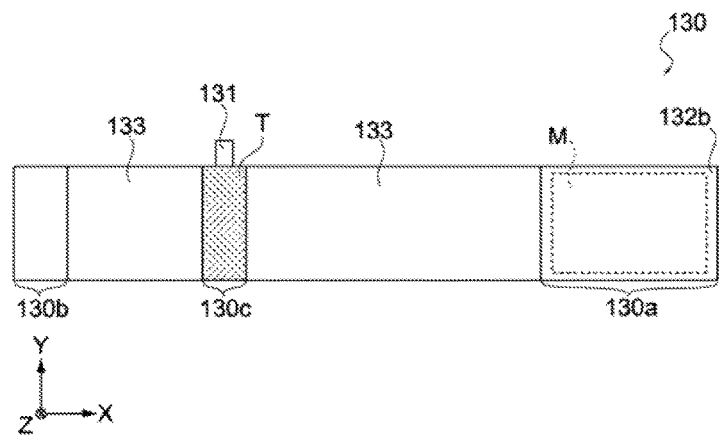

FIGS. 4A and 4B provide schematic views showing the negative electrode 130 before winding, where FIG. 4A is a side view, while FIG. 4B is a view from the Z direction. The negative electrode 130 pertaining to this embodiment has the negative electrode active material layers 133 formed on both the first principal face 132a and second principal face 132b of the negative electrode collector 132, as shown in FIG. 4A.

Here, first and second uncoated regions 130a, 130b, and a peeled region 130c where no negative electrode active material layer 133 is formed, are provided on the second principal face 132b of the negative electrode 130, as shown in FIG. 4A.

Metal lithium M that becomes a source of lithium ions is joined to the negative electrode collector 132 inside the first uncoated region 130a, as shown in FIG. 4B. The shape of the metal lithium M is not limited in any way, but preferably it is shaped like a foil so that the thickness of the electric storage element 110 can be reduced. The amount of metal lithium M may be just enough to dope the negative electrode active material layers 133 in the pre-doping of lithium ions as described below.

The X-direction length of the first uncoated region 130a and that of the second uncoated region 130b are not limited in any way, but preferably the X-direction length of the second uncoated region 130b is approx. one-half the diameter of the winding core C, multiplied by π.

The negative electrode terminal 131 is connected to the negative electrode collector 132 inside the peeled region 130c, and led out to the exterior of the negative electrode 130, as shown in FIG. 4A. Also, the peeled region 130c pertaining to this embodiment is sealed by a tape T, as shown in FIG. 4A, so that the negative electrode collector 132 inside the peeled region 130c will not be exposed. The type of tape T is not limited in any way, but preferably a type having heat resistance and also insoluble in the solvent of electrolytic solution is adopted. The negative electrode terminal 131 is a copper terminal, for example.

The positive electrode 140 has a positive electrode collector 142 and positive electrode active material layers 143, as shown in FIG. 3. The positive electrode collector 142 is made of conductive material, and may be an aluminum foil or other metal foil. The positive electrode collector 142 may be a metal foil whose surface is roughened by a chemical or mechanical means, or a metal foil in which through holes have been formed.

The positive electrode active material layers 143 are formed on the positive electrode collector 142. The material for the positive electrode active material layers 143 may be a mixture of a positive electrode active material and a binder resin, which may further contain a conductive aid. For the positive electrode active material, any material capable of adsorbing lithium ions and anions in the electrolytic solution may be used, such as active carbon or polyacene carbide, for example.

For the binder resin, any synthetic resin that joins the positive electrode active material may be used, such as styrene butadiene rubber, polyethylene, polypropylene, polyethylene terephthalate, aromatic polyamide, carboxy methyl cellulose, fluororubber, polyvinylidene fluoride, isoprene rubber, butadiene rubber, and ethylene propylene rubber, for example.

The conductive aid is constituted by grains made of conductive material, and improves the conductivity between positive electrode active materials. The conductive aid may be graphite, carbon black, or other carbon material, for example. Any of these may be used alone or multiple types may be mixed. It should be noted that the conductive aid may be a material having conductivity, such as metal material and conductive polymer, among others.

Figure 5A:
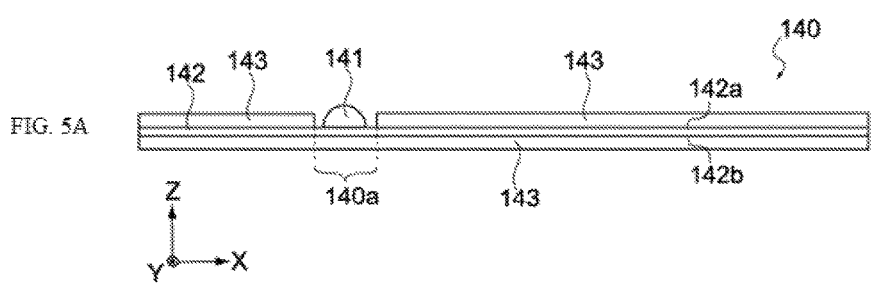
FIGS. 5A and 5B provide schematic views showing the positive electrode before winding in the same embodiment.
Figure 5B:
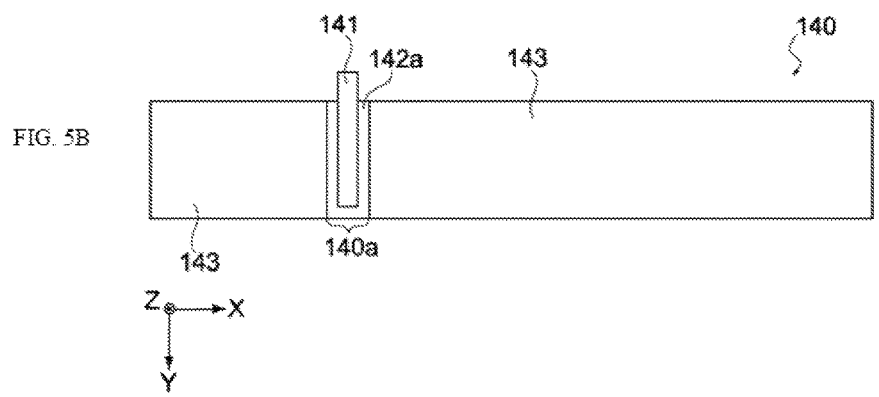

FIGS. 5A and 5B provide schematic views showing the positive electrode 140 before winding, where FIG. 5A is a side view, while FIG. 5B is a plan view. The positive electrode 140 pertaining to this embodiment has the positive electrode active material layers 143 formed on both the third principal face 142a and fourth principal face 142b of the positive electrode collector 142, and a peeled region 140a where no positive electrode active material layer 143 is formed is provided on the third principal face 142a, as shown in FIG. 5A.

Here, the positive electrode terminal 141 is connected to the positive electrode collector 142 inside the peeled region 140a, and led out to the exterior of the positive electrode 140, as shown in FIG. 5A. It should be noted that the peeled region 140a on which the positive electrode terminal 141 is placed may be formed on the fourth principal face 142b of the positive electrode 140. Also, the peeled region 140a may be sealed by a tape, etc. The positive electrode terminal 141 is an aluminum terminal, for example.

The separators 150 insulate the negative electrode 130 and positive electrode 140, and have a first separator 151 and a second separator 152, as shown in FIG. 3.

The first separator 151 and second separator 152 separate the negative electrode 130 and positive electrode 140, while letting the ions contained in the electrolytic solution described later permeate through them. To be specific, the first separator 151 and second separator 152 may be made of woven fabric, non-woven fabric, synthetic resin film with fine pores, etc. Also, the first separator 151 and second separator 152 may be continuous parts of one separator.

Figure 6:
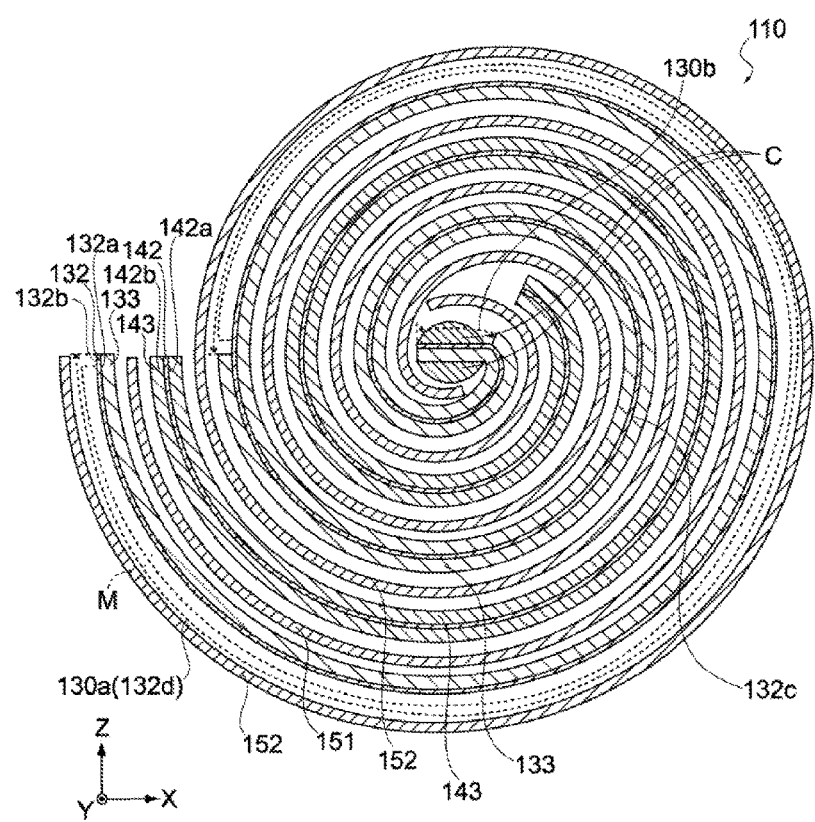
FIG. 6 is a section view of the electric storage element in the same embodiment.

FIG. 6 is a section view of the electric storage element 110 (the negative electrode terminal 131 and positive electrode terminal 141 are not illustrated). The electric storage element 110 pertaining to this embodiment is constituted by the negative electrode 130 and positive electrode 140 that are stacked together and wound with the first separator 151 and second separator 152 in between, as shown in FIG. 6. To be specific, it is constituted in such a way that the first principal face 132a of the negative electrode collector 132 and the third principal face 142a of the positive electrode collector 142 are on the inner side of winding, while the second principal face 132b of the negative electrode collector 132 and the fourth principal face 142b of the positive electrode collector 142 are on the outer side of winding.

Here, the electric storage element 110 is constituted so that the electrode on the outermost side of winding (outermost periphery) becomes the negative electrode 130, and as shown in FIG. 6, a first uncoated region 130a is provided on the second principal face 132b of the negative electrode collector 132 on the outermost side of winding, while a second uncoated region 130b is provided at the end of the negative electrode collector 132 on the innermost side of winding.

Also, the first principal face 132a of the negative electrode collector 132 is opposed to the positive electrode 140 (positive electrode active material layer 143) via the first separator 151, as shown in FIG. 6. As shown in the figure, the second principal face 132b has a first region 132c opposed to the positive electrode 140 (positive electrode active material layer 143) via the second separator 152, and a second region 132d on the outermost side of winding and not opposed to the positive electrode 140 (positive electrode active material layer 143).

As shown in FIG. 6, the second principal face 132b includes the second uncoated region 130b, while the second region 132d includes the first uncoated region 130a. The first uncoated region 130a pertaining to this embodiment is provided over the entire second region 132d and metal lithium M is placed therein, as shown in FIG. 6. It should be noted that the first uncoated region 130a need not be provided over the entire second region 132d; instead, it may be provided in a part of the second region 132d.

The container 120 houses the electric storage element 110. The top face and bottom face of the container 120 may be closed by lids (not illustrated). The material of the container 120 is not limited in any way, and may be a metal whose primary component is aluminum, titanium, nickel or iron, or stainless steel, for example.

The electrochemical device 100 is constituted as described above. The electrolytic solution housed in the container 120 together with the electric storage element 110 is a liquid containing lithium ions and anions; for example, it may be a liquid prepared by dissolving an electrolyte, such as $LiBF_4$ or $LiPF_6$, in a solvent (carbonate ester, etc.).

[Effects of Electrochemical Device]

Next, the effects of the electrochemical device 100 are explained. The electrochemical device 100 pertaining to this embodiment is such that, when the electric storage element 110 to which metal lithium M is joined contacts the electrolytic solution, the metal lithium M oxidizes and dissolves, and consequently lithium ions (Li+) and electrons (e−) are produced from the metal lithium M. As a result, the lithium ions diffuse in the electrolytic solution and are doped into the negative electrode active material contained in the negative electrode active material layer 133, and the electrons flow to the negative electrode 130. When aging is performed in this state, the lithium ions are pre-doped into the negative electrode 130 (negative electrode active material layer 133).

Now, with the general lithium ion capacitors heretofore available, one widely used method to pre-dope lithium ions into the negative electrode is to immerse in electrolytic solution an electric storage element whose negative electrode is connected to a lithium collector to which metal lithium is attached. Under this method, however, the lithium collector must be prepared separately and also a step to connect the lithium collector to the negative electrode collector is required, which results in lower productivity.

Also, with the aforementioned lithium ion capacitors, voltage drop or other problems may occur when lithium ions are pre-doped into the negative electrode, due to fine lithium powder that generates in the pre-doping process, in which case reliability of the capacitors may not be ensured.

With the electrochemical device 100 pertaining to this embodiment, on the other hand, metal lithium M that becomes a source of lithium ions is connected to the second principal face 132b on the outermost side of winding which is not opposed to the positive electrode 140 via the separator 150, as shown in FIG. 6.

This means that, even if fine lithium powder generates when lithium ions are pre-doped into the negative electrode 130, the lithium powder is prevented from contacting the positive electrode 140. This makes it unlikely for problems to occur due to the effect of lithium powder generating in the process of pre-doping into the negative electrode 130, which in turn makes it possible to ensure reliability in a more stable manner than heretofore achievable with the conventional lithium ion capacitors.

Also with the electrochemical device 100 pertaining to this embodiment, metal lithium M can be attached over the entire second region 132d on the outermost side of winding on the second principal face 132b, as shown in FIG. 6, so a sufficient amount of lithium ions can be pre-doped into the negative electrode 130 to increase the capacitance of the capacitor. In particular, the second region 132d on the outermost side of winding is a region not opposed to the positive electrode 140 via separator 150, and therefore by utilizing this region as the first uncoated region 130a, metal lithium M can be placed without reducing the capacitance of the electric storage element 110.

Furthermore, unlike with conventional lithium ion capacitors, there is no need to separately prepare a lithium collector in order to pre-dope lithium ions into the negative electrode 130, nor is there a need for a step to connect such lithium collector to the negative electrode collector 132, and therefore productivity can be ensured.

[Method of Manufacturing Electrochemical Device]

A method of manufacturing the electrochemical device 100 pertaining to this embodiment is explained. It should be noted that the manufacturing method described below is only one example and the electrochemical device 100 may be manufactured using a manufacturing method different from the manufacturing method described below. FIGS. 7A to 11C are schematic views illustrating a manufacturing process of the electrochemical device 100.

Figure 7A:
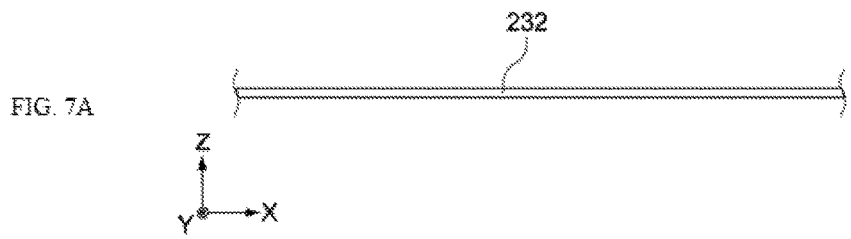
FIGS. 7A, 7B, and 7C show schematic views showing a manufacturing process of the electrochemical device pertaining to the same embodiment.

FIG. 7A shows a metal foil 232 in which through holes have been formed, which will become the negative electrode collector 132. The metal foil 232 is a copper foil, for example. The thickness of the metal foil 232 is not limited in any way, but it may be anywhere from several tens of μm to several hundreds of μm, for example.

Figure 7B:
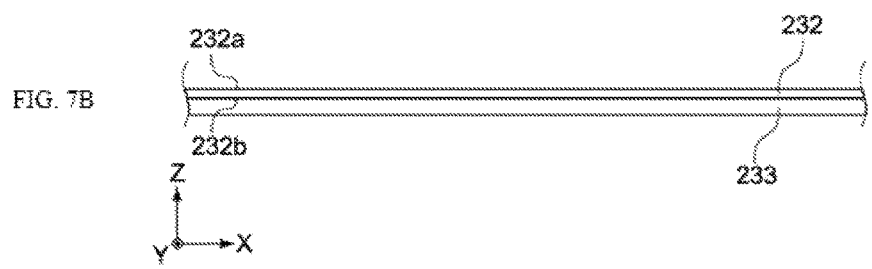

Next, a negative-electrode paste containing negative electrode active material, conductive aid, binder, etc., is applied on a bottom face 232b of the metal foil 232, and then dried or hardened. As a result, a negative electrode active material layer 233 is formed on the bottom face 232b of the metal foil 232, as shown in FIG. 7B.

Figure 7C:
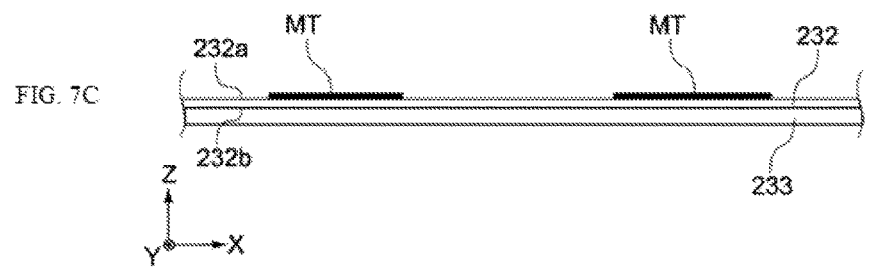
Figure 8A:
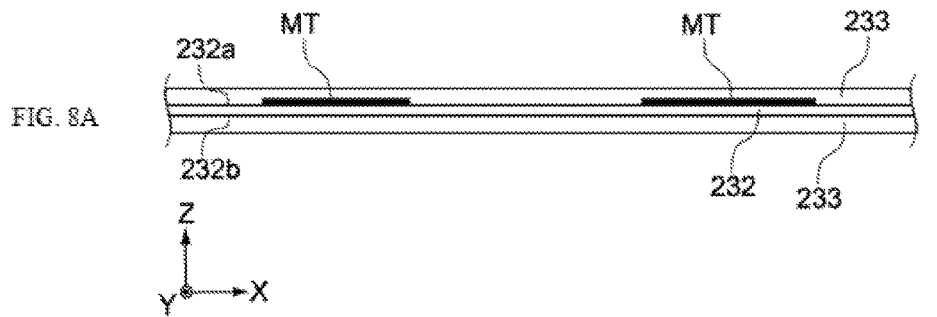
FIGS. 8A, 8B, and 8C show schematic views showing a manufacturing process of the electrochemical device pertaining to the same embodiment.

Next, as shown in FIG. 7C, masking tapes MT are attached on a top face 232a of the metal foil 232 in the X direction at equal intervals. Then, the negative-electrode paste is applied on the top face 232a of the metal foil 232 to which the masking tapes MT have been attached, after which the paste is dried or hardened to form a negative electrode active material layer 233 on the top face 232a of the metal foil 232, as shown in FIG. 8A.

Figure 8B:
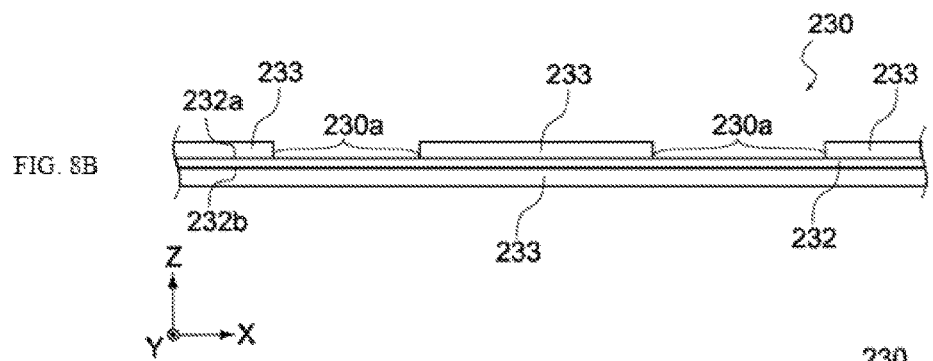

Next, the negative electrode active material layer 233 formed on the top face 232a of the metal foil 232 is partially removed by peeling off the masking tapes MT, to obtain an electrode layer 230 on which peeled regions 230a where the metal foil 232 is exposed are formed, as shown in FIG. 8B. As a result, multiple negative electrode active material layers 233 are formed at specified intervals on the top face 232a of the metal foil 232, as shown in the figure. The negative electrode active material layers 233 may be formed by a method other than masking.

Figure 8C:
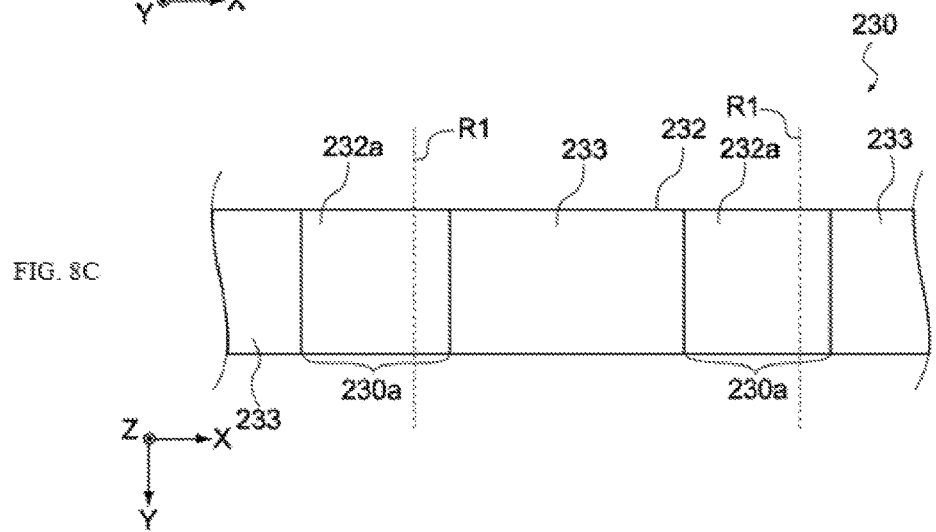
Figure 9A:
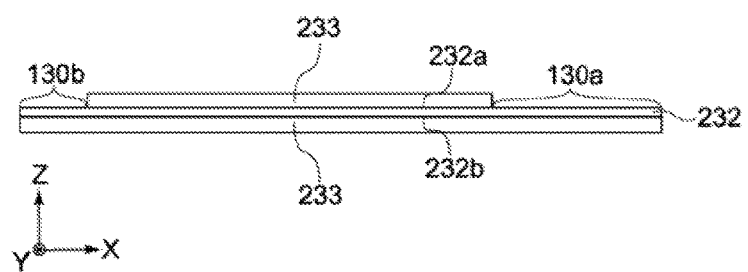
FIGS. 9A and 9B show schematic views showing a manufacturing process of the electrochemical device pertaining to the same embodiment.

Next, as shown in FIG. 8C, the metal foil 232 and the negative electrode active material layer 233 on its bottom face 232b are cut together between the negative electrode active material layers 233 that have been formed at specified intervals on the top face 232a of the metal foil 232 (along the dotted line R1 shown in FIG. 8C). As a result, a first uncoated region 130a and a second uncoated region 130b are formed on the top face 232a of the metal foil 232, as shown in FIG. 9A.

Figure 9B:
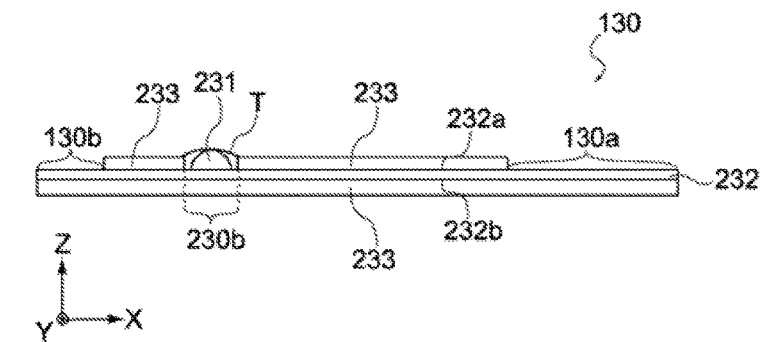

Next, the negative electrode active material layers 233 formed on the top face 232a of the metal foil 232 are partially peeled off, to form a peeled region 230b where the metal foil 232 is exposed as shown in FIG. 9B. Then, as shown in the figure, the negative electrode terminal 231 is connected to the metal foil 232 inside the peeled region 230b and then the peeled region 230b is sealed by a tape T, to obtain a negative electrode 130.

Figure 10A:
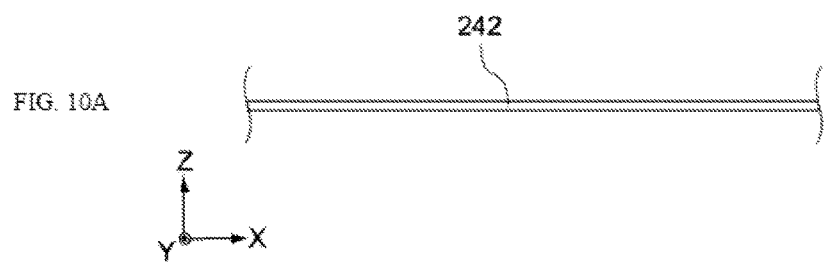
FIGS. 10A, 10B, and 10C show schematic views showing a manufacturing process of the electrochemical device pertaining to the same embodiment.

Next, as shown in FIG. 10A, a metal foil 242 in which through holes have been formed, which will become the positive electrode collector 142, is prepared. The metal foil 242 is an aluminum foil, for example. The thickness of the metal foil 242 is not limited in any way, but it may be anywhere from several tens of μm to several hundreds of μm, for example.

Figure 10B:
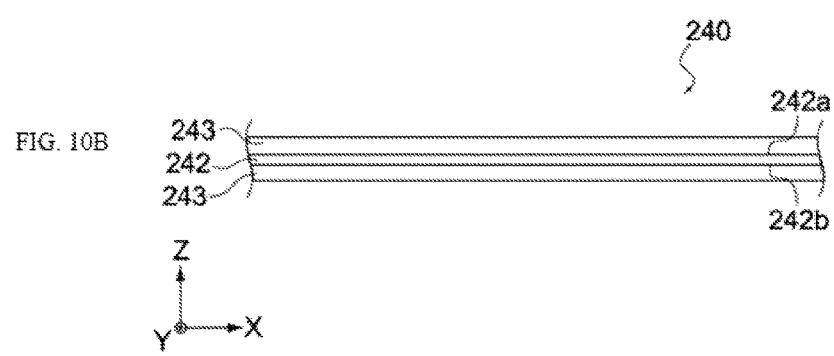

Next, a positive-electrode paste containing positive electrode active material, conductive aid, binder, etc., is applied on a top face 242a and bottom face 242b of the metal foil 242, and then dried or hardened. As a result, an electrode layer 240 having a positive electrode active material layer 243 formed on the metal foil 242, is obtained, as shown in FIG. 10B.

Figure 10C:
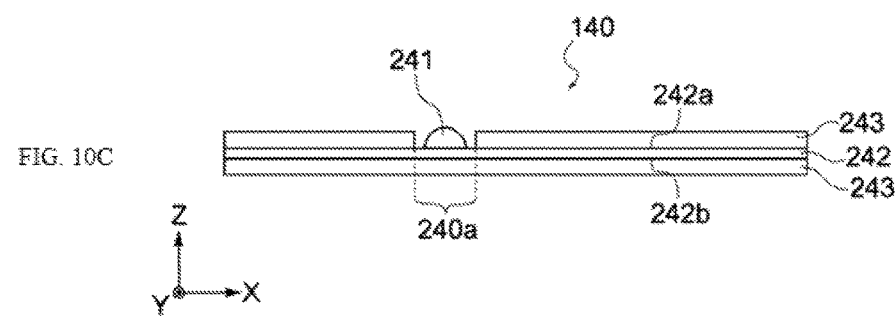

Next, the electrode layer 240 is cut and the positive electrode active material layer 243 formed on either the top face 242a or bottom face 242b of the metal foil 242 is partially peeled off, to form a peeled region 240a in which the metal foil 242 is exposed, as shown in FIG. 10C. Then, as shown in the figure, the positive electrode terminal 241 is connected to the metal foil 242 inside the peeled region 240a, to obtain a positive electrode 140.

Figure 11A:
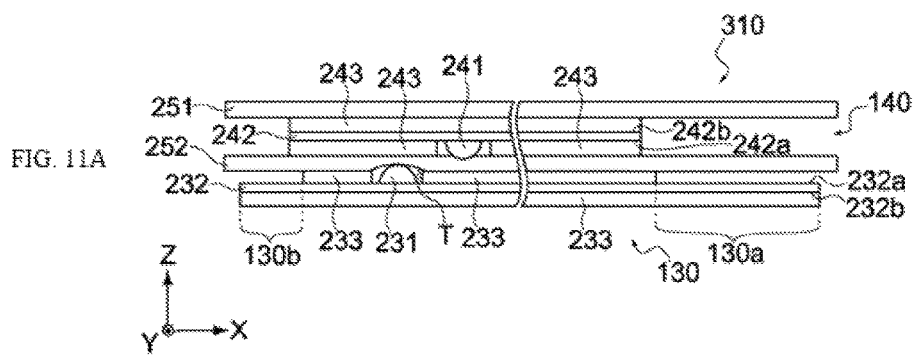
FIGS. 11A, 11B, and 11C show schematic views showing a manufacturing process of the electrochemical device pertaining to the same embodiment.
Figure 11B:
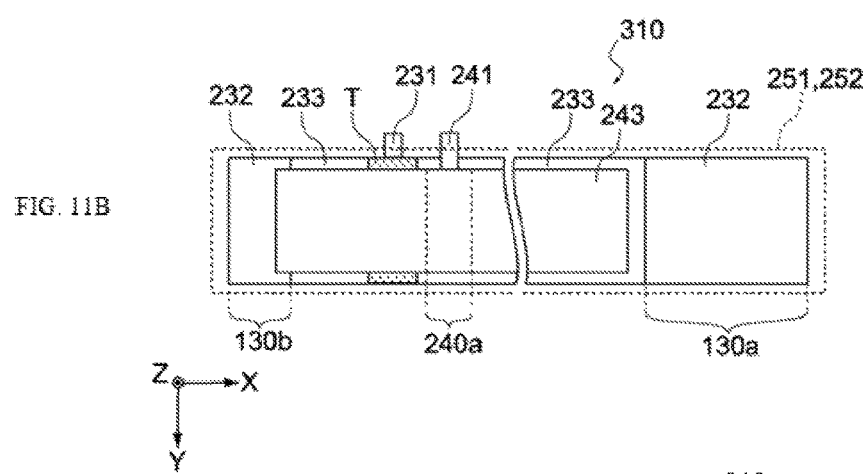

Next, the negative electrode 130, positive electrode 140, first separator 251 and second separator 252 are stacked, to obtain a laminate 310, as shown in FIGS. 11A and 11B. Here, the laminate 310 is positioned in such a way that the negative electrode 130 is on the inner side of winding, the positive electrode 140 is on the outer side of winding, and the second uncoated region 130b of the negative electrode 130 is on the winding core C side, as shown in FIG. 11A. It should be noted that FIG. 11B is a plan view of the laminate 310 shown in FIG. 11A.

Figure 11C:
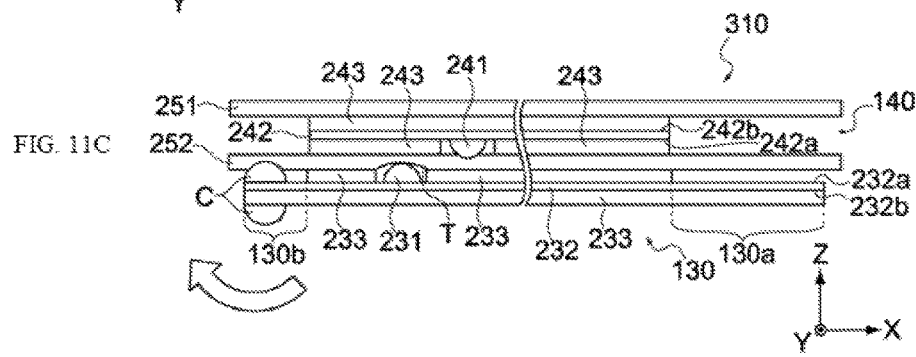

Next, as shown in FIG. 11C, the positive electrode 140 is shifted by a specified amount in the X direction so that the positive electrode 140 is no longer opposed to the second uncoated region 130b via the second separator 252. Then, with the metal foil 232 inside the second uncoated region 130b and the negative electrode active material layer 233 clamped in the winding core C, as shown in the figure, the laminate 310 is wound clockwise around the winding core C so that the first uncoated region 130a becomes the outermost side of winding.

This way, a wound body (refer to FIGS. 2 and 6) constituted by the bottom face 232b of the metal foil 232 and top face 242a of the metal foil 242 on the inner side of winding, and also by the top face 232a of the metal foil 232 and bottom face 242b of the metal foil 242 on the outer side of winding, is obtained.

Next, metal lithium M is joined to the first uncoated region 130a positioned on the outermost side of winding of the wound body obtained in the aforementioned step (refer to FIG. 6), to obtain an electric storage element 110. Next, the electric storage element 110 to which metal lithium M is joined is housed in a container 120 in which electrolytic solution is contained, and the container is sealed. This way, lithium ions are doped from the metal lithium M into the negative electrode active material layer 233.

The electrochemical device 100 can be manufactured as described above. It should be noted that the negative electrode terminal 231 corresponds to the negative electrode terminal 131, while the positive electrode terminal 241 corresponds to the positive electrode terminal 141. Also, the peeled region 230b corresponds to the peeled region 130c, while the peeled region 240a corresponds to the peeled region 140a.

Furthermore, the metal foil 232 corresponds to the negative electrode collector 132 and the metal foil 242 corresponds to the positive electrode collector 142, while the negative electrode active material layer 233 corresponds to the negative electrode active material layer 133 and the positive electrode active material layer 243 corresponds to the positive electrode active material layer 143.

Additionally, the top faces 232a and 242a correspond to the second principal face 132b and third principal face 142a, respectively, while the bottom faces 232b and 242b correspond to the first principal face 132a and fourth principal face 142b, respectively. Also, the first separator 251 corresponds to the first separator 151, while the second separator 252 corresponds to the second separator 152.

Variation Example

Figure 12:
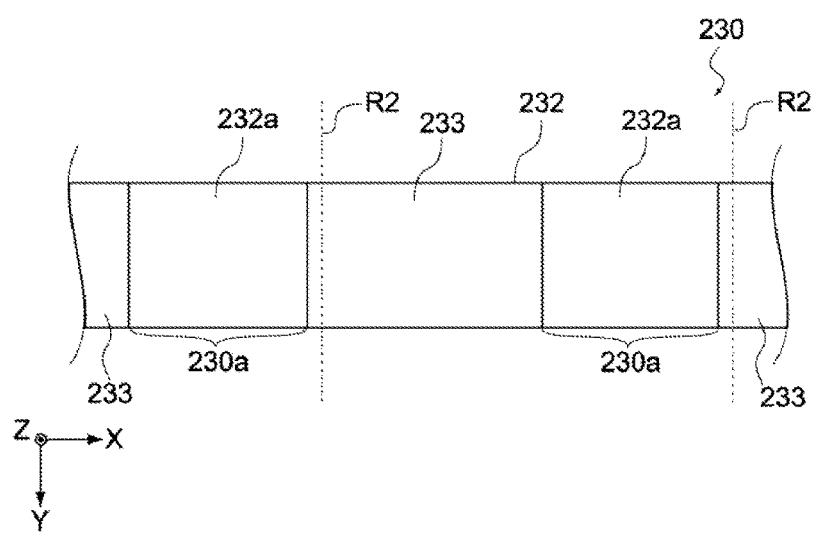
FIG. 12 shows a schematic view showing a manufacturing process of the electrochemical device pertaining to a variation example of the same embodiment.

The constitution and manufacturing method of the electrochemical device 100 are not limited to the foregoing. FIG. 12 is a schematic view showing a manufacturing process of the electrochemical device 100 pertaining to a variation example, while FIG. 13 is a section view of the electric storage element 110 pertaining to a variation example.

In the aforementioned embodiment, when the electrode layer 230 is cut, the metal foil 232 and the negative electrode active material layer 233 formed over its entire bottom face 232b are cut together between the negative electrode active material layers 233 formed at specified intervals on the top face 232a of the metal foil 232 (refer to FIG. 8C); however, this is not the only way and, as shown in FIG. 12, the negative electrode active material layers 233 formed on the top face 232a of the metal foil 232 may be cut together with the negative electrode active material layer 233 formed over the entire bottom face 232b as well as the metal foil 232 (along the dotted line R2 shown in FIG. 12).

Figure 13:
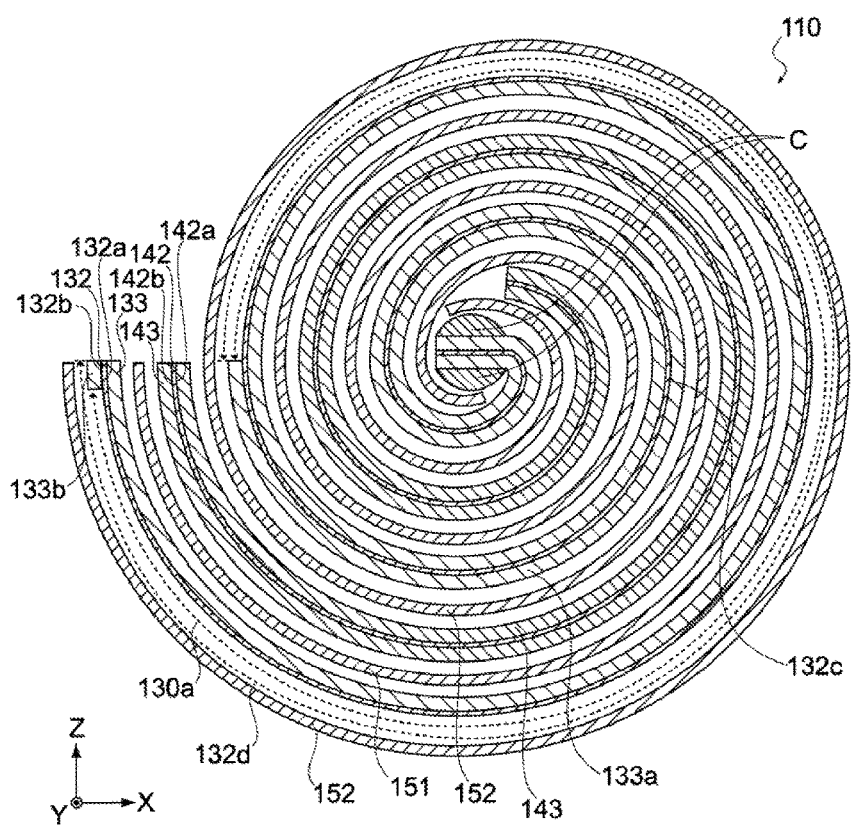
FIG. 13 is a section view of the electric storage element pertaining to a variation example of the same embodiment.

When the electrode layer 230 is cut this way, the negative electrode 130 now includes the first negative electrode active material layer 133a formed in the first region 132c of the second principal face 132b, as well as the second negative electrode active material layer 133b formed at the end of the negative electrode collector 132 away from the first negative electrode active material layer 133a, as shown in FIG. 13. And, as shown in the figure, the negative electrode 130 is now constituted in such a way that it has the first uncoated region 130a on the second principal face 132b between the first negative electrode active material layer 133a and second negative electrode active material layer 133b.

This means that the second negative electrode active material layer 133b is provided at the end of the negative electrode collector 132, as shown in FIG. 13. Although the cut sides of the negative electrode collector 132 may become sharp, this constitution can prevent the second separator 152 from being damaged by the cut sides because the second negative electrode active material layer 133b is positioned on the cut sides of the negative electrode collector 132.

Example

Electrochemical devices pertaining to an example and comparative examples of the present invention were produced and characteristics tests were performed thereon.

[Production of Electrochemical Device]

Example 1

The electrochemical device was produced as follows. First, non-graphitizable carbon, conductive aid, binder, and thickening agent were mixed and kneaded in water, to produce a negative-electrode paste. Then, the negative-electrode paste was applied on one side of a negative electrode collector, or specifically a copper foil of 15 μm in thickness that had through holes of 100 μm in diameter formed by etching and occupying 30 percent of the area of the principal face, after which the paste was dried for 12 hours in a depressurized environment of 180° C. and 1 kPa or less, to form a negative electrode active material layer of 50 μm in thickness on the bottom face of the copper foil (refer to FIG. 7B).

Next, masking tapes of 30 mm in width were attached to the top face of the copper foil at intervals of 210 mm in the length direction of the copper foil. Next, the negative-electrode paste was applied on the top face of the copper foil to which the masking tapes were attached, and dried in an ambience of 80° C. After the paste dried, the masking tapes were peeled off to form, on the top face of the copper foil, an electrode layer having peeled regions where no negative electrode active material layer was formed (refer to FIG. 8B). The electrode with peeled regions was dried for 12 hours in a depressurized environment of 180° C. and 1 kPa or less.

Next, the electrode layer was cut and the negative electrode active material layer formed on the top face of the copper foil was partially peeled off, to form a peeled area. Then, a copper terminal was needle-clinched in this peeled area and the peeled area was sealed together with the copper terminal by a tape, to produce a negative electrode of 27 mm in width and 210 mm in length (refer to FIG. 9B).

Next, active carbon, conductive aid, binder, and thickening agent were mixed and kneaded in water, to produce a positive-electrode paste. Then, the positive-electrode paste was applied on both the top and bottom faces of a positive electrode collector, or specifically an aluminum foil of 30 μm in thickness to which air permeability was added by forming through holes by etching, after which the paste was dried for 12 hours in a depressurized environment of 180° C. and 1 kPa or less, to form an electrode layer having a positive electrode active material layer of approx. 100 μm in thickness on both the top and bottom faces (refer to FIG. 10B).

Next, the electrode layer was cut and the positive electrode active material layer formed on either the top or bottom face of the aluminum foil was partially peeled off, to form a peeled area. Then, an aluminum terminal was needle-clinched in this peeled area, to produce a positive electrode of 24 mm in width and 170 mm in length (refer to FIG. 10C).

Next, a cellulose separator of 45 percent in density and 35 μm in thickness was cut to equal widths with a length of 30 mm, to produce separators. It should be noted that, when producing the separators, a drying condition of 12 hours in a depressurized environment of 160° C. and 1 kPa or less was used.

Next, the positive electrode, negative electrode, and separators obtained above were stacked to obtain a laminate, and then this laminate was wound in such a way that the bottom face of the copper foil was on the inner side of winding and its top face was on the outer side of winding (refer to FIG. 11C). As a result, a wound body having one uncoated region formed on the top face of the copper foil positioned on the inner side of winding, and the other uncoated region positioned on the outermost side of winding, was obtained (refer to FIG. 6).

Next, metal lithium of 0.1 mm in thickness, 25 mm in width and 25 mm in length was joined to the uncoated region positioned on the outermost side of winding of the wound body obtained above. Next, the separators were secured together with tapes and seal rubbers were fitted into the aluminum terminal and copper terminal, to obtain an electric storage element.

Next, the electric storage element was inserted into an aluminum case of 12.5 mm in opening diameter in which electrolytic solution was contained, and then the case was sealed, to produce the electrochemical device in this Example. For the electrolytic solution, propylene carbonate solution using $LiPF_6$ as solute (1 mol/L) was adopted.

Comparative Examples

Next, the electrochemical devices pertaining to Comparative Examples 1 to 3 were produced. The electrochemical device pertaining to Comparative Example 1 was produced in the same way the electrochemical device pertaining to the Example was produced, except that the lithium metal was inserted between the negative electrode active material layer and the separator.

The electrochemical device pertaining to Comparative Example 2 was produced in the same way the electrochemical device pertaining to the Example was produced, except that the outermost side of winding of the negative electrode was caused to project more than the end of the positive electrode and the lithium metal was attached to the negative electrode active material layer in the location projecting beyond the end of the positive electrode. Here, the amount of lithium metal was determined so that the capacitance of the electrochemical device pertaining to Comparative Example 2 would become equivalent to the capacitance of the electrochemical device pertaining to Example 1.

The electrochemical device pertaining to Comparative Example 3 was produced in the same way the electrochemical device pertaining to Comparative Example 2 was produced, except that any negative electrode active material layer not involved in charging or discharging was removed.

[Evaluation of Characteristics]

Next, 20 pieces each of the electrochemical devices pertaining to the example and comparative examples were prepared and stored for one week in an environment of 60° C., after which the characteristics of each device were examined. To be specific, each device was examined for capacitance, whether or not voltage drop would occur, and remaining metal lithium. FIG. 14 is a table showing the results. It should be noted that the "Capacitance obtained" column in FIG. 14 shows the average of the capacitances obtained from the respective devices.

As for the conditions of capacitance measurement, measurements were taken by charging and discharging each device under the conditions of 3.8 V of charge voltage, 0.5 A of charge current, 10 minutes of CV (constant voltage) time (0.5 A is applied until the voltage reaches 3.8 V, after which 3.8 V is held for 10 minutes), 0.05 A of discharge current, and 2.2 V of cutoff voltage. Also, to examine whether or not voltage drop would occur, the 1,000 charge/discharge cycle test was conducted under the same conditions as specified above to see if the voltage had dropped in any of the 20 devices.

As shown in FIG. 14, all 20 electrochemical devices pertaining to Example 1 had zero metal lithium remaining, meaning that the entire amount was pre-doped. Also, no device experienced voltage drop and all devices exhibited high capacitance.

On the other hand, many of the electrochemical devices pertaining to Comparative Example 1 had lithium metal still remaining, and their capacitances were also lower than those of the electrochemical devices pertaining to Example 1, as shown in FIG. 14.

In the meantime, as shown in FIG. 14, the electrochemical devices pertaining to Comparative Example 2 had no lithium metal remaining and did not experience voltage drop, either, and their capacitances were also equivalent to those of the electrochemical devices in Example 1; however, they used more lithium metal than the electrochemical devices in Example 1. This suggests that the electrochemical devices pertaining to Comparative Example 2 need a lot of lithium metal to achieve capacitance storage equivalent to the electrochemical devices in Example 1, which may add to manufacturing cost.

Additionally, as shown in FIG. 14, voltage dropped after the charge-discharge cycle test in some of the electrochemical devices pertaining to Comparative Example 3. This is likely due to the fine lithium powder that generated in the process of pre-doping the lithium metal into the negative electrode. Based on the above, it can be concluded that the electrochemical device pertaining to the aforementioned embodiment has a structure that allows metal lithium pre-doping to progress favorably, while preventing voltage drop or other characteristic deterioration from occurring easily.

The foregoing explained an embodiment of the present invention; however, it goes without saying that the present invention is not limited to the aforementioned embodiment and that various changes can be added.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-025621, filed Feb. 15, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electrochemical device comprising:
    a negative electrode which is a metal foil constituted by a negative electrode collector having a first principal face and a second principal face on an opposite side of the first principal face, and also by negative electrode active material layers formed on the first principal face and second principal face;
    a positive electrode which is a metal foil constituted by a positive electrode collector having a third principal face and a fourth principal face on an opposite side of the third principal face, and also by positive electrode active material layers formed on the third principal face and fourth principal face;
    separators that insulate the positive electrode and negative electrode; and
    electrolytic solution that immerses the positive electrode, negative electrode and separators;
    where the positive electrode, negative electrode, and separators are stacked and wound in such a way that the first principal face and third principal face are on an inner side of winding, and the second principal face and fourth principal face are on an outer side of winding, with the separators separating the positive electrode and negative electrode; wherein:
    the first principal face is opposed to the positive electrode via the separator;
    the second principal face has a first region opposed to the positive electrode via the separator, and a second region on an outermost side of winding and not opposed to the positive electrode; and
    the second region includes a first uncoated region where the negative electrode active material layer is not formed, and the first uncoated region has a metal lithium joined to it and is immersed in the electrolytic solution to pre-dope lithium ions into the negative-electrode active layer,
    wherein the negative electrode includes a first negative electrode active material layer formed in the first region, as well as a second negative electrode active material layer formed in the second region at an end of the negative electrode collector away from the first negative electrode active material layer; and
    the first uncoated region is provided between the first negative electrode active material layer and the second negative electrode active material layer.

2. An electrochemical device according to claim 1, wherein the first uncoated region is provided over an entire second region.

3. An electrochemical device according to claim 2, wherein the second principal face includes, at an end of the negative electrode collector on an innermost side of winding, a second uncoated region where the negative electrode active material layer is not provided.

4. An electrochemical device according to claim 1, wherein the second principal face includes, at an end of the negative electrode collector on an innermost side of winding, a second uncoated region where the negative electrode active material layer is not provided.

5. An electrochemical device according to claim 2, wherein the negative electrode collector is made of copper.

6. An electrochemical device according to claim 1, wherein the negative electrode collector is made of copper.

7. An electrochemical device according to claim 2, wherein the negative electrode collector has multiple through holes.

8. An electrochemical device according to claim 1, wherein the negative electrode collector has multiple through holes.

9. An electrochemical device according to claim 3, wherein the negative electrode collector has multiple through holes.

* * * * *